Sept. 30, 1969  J. L. HEESTERS ET AL  3,469,378
ROTATING DISC TYPE MOWING MACHINE
Filed May 17, 1966  8 Sheets-Sheet 1

JOHANNES L. HEESTERS
LAURENTIUS C. HEESTERS
ADRIANUS L. HEESTERS
PETRUS W. ZWEEGERS

INVENTORS

BY Breitenfeld & Levine
ATTORNEYS

Sept. 30, 1969  J. L. HEESTERS ET AL  3,469,378

ROTATING DISC TYPE MOWING MACHINE

Filed May 17, 1966  8 Sheets-Sheet 2

JOHANNES L. HEESTERS
LAURENTIUS C. HEESTERS
ADRIANUS L. HEESTERS
PETRUS W. ZWEEGERS
INVENTORS

BY Breitenfeld & Levine

ATTORNEYS

Sept. 30, 1969    J. L. HEESTERS ET AL    3,469,378
ROTATING DISC TYPE MOWING MACHINE
Filed May 17, 1966    8 Sheets-Sheet 3

JOHANNES L. HEESTERS
LAURENTIUS C. HEESTERS
ADRIANUS L. HEESTERS
PETRUS W. ZWEEGERS
INVENTORS

BY Breitenfeld & Levine
ATTORNEYS

United States Patent Office 3,469,378
Patented Sept. 30, 1969

3,469,378
ROTATING DISC TYPE MOWING MACHINE
Johannes L. Heesters, Laurentius C. Heesters, and Adrianus L. Heesters, Haaren, and Petrus W. Zweegers, Geldrop, Netherlands, assignors to P. J. Zweegers and Zonen Landbouwmachinefabriek N.V., Postbus, Geldrop, Netherlands, a limited liability company
Filed May 17, 1966, Ser. No. 550,785
Claims priority, application Netherlands, May 20, 1965, 6506452; Sept. 17, 1965, 6512120; Dec. 23, 1965, 6516802; Dec. 24, 1965, 6516880
Int. Cl. A01d 35/26, 75/30, 55/18
U.S. Cl. 56—25.4                                    31 Claims

ABSTRACT OF THE DISCLOSURE

Machine includes flat case-like support housing transmission means for rotating shafts projecting through top wall of support. Disks mounted on shaft carry radial cutters. Paths of cutters overlap at point in front of support and each path extends under adjacent disk. Top surfaces of disks serve to support and move cut crop rearwardly.

---

This invention relates to a mowing machine, and especially to such a machine of the kind which comprises an oblong, flat, case-like support which, in its operating position, is held parallel and close to the ground and in which are mounted a plurality of pairs of upright shafts which are distributed along the length of the support. The shafts of each pair are rotatable in mutually opposite directions, and each shaft carrying a cutting disc so that the cutting portions of the cutting discs of each pair of shafts, when rotated, follow paths in a plane which is substantially parallel to the ground; the paths overlapping each other at an overlap point which is located in front of the support, seen in the direction of motion of the machine as a whole, the shafts of the cutting discs being rotatable by a common drive mechanism mounted within the case-shaped support.

In a known mowing machine of the kind referred to, the greater part of each cutting disc is within the interior space of the case-like support and only a small front portion of each cutting disc protrudes through the open front of the case-shaped support and cooperates there with stationary cutting means mounted in front of the open front side of the case-shaped support. The disadvantage of this machine is that in use it will soon be clogged and the mowed crop is not suitably discharged.

The object of the invention is to provide a mowing machine of the above type, in which the mowed crop is suitably discharged and in which no clogging occurs.

According to the invention, this object is obtained by having the shafts of the cutting discs protrude through the upper wall of the case-shaped support and the cutting discs themselves mounted on the shafts immediately over the upper wall of the case-shaped support such that the substantially continuous upper surface of each cutting disc is entirely exposed and the mowed crop is rearwardly discharged close to the ground over the upper surfaces of the cutting discs.

Preferably, each cutting disc is provided with two diametrally opposite cutters which protrude substantially radially from the periphery of the cutting disc, the cutters of two adjacent cutting discs being mutually off-set over 90° so that the cutting discs themselves do not overlap but the paths of motion of the cutters do overlap.

In use of the mowing machine according to the invention, the two oppositely rotating cutting discs of each pair convey the mowed crop to their overlapping area and in this area, the mowed crop is moved rearwardly by the rearwardly moving adjacent portions of the two oppositely rotating cutting discs, so that the crop is discharged to the rear of the machine and is there deposited in the shape of a swath.

With respect to devices in which the drive mechanism is mounted over the cutting discs, the present invention offers the advantage that there is no limited discharge height for the mowed crop.

There are also known devices in which all cutting discs rotate in the same direction. In these known devices, the adjacent portions of two adjacent cutting discs have contrary motions in their overlapping area, so that these known devices do not properly discharge the mowed crop.

The total height of the mowing machine according to the invention may be very small and it is possible to keep the cutting plane of the cutting discs at less than two inches over the ground. Since there are no obstacles over the cutting discs, cereals and green crops of any length and harvest destination can be mowed, the discharge of the mowed crop is not obstructed and the seeds such as wheat grains and grass seeds are handled very carefully so that only a minimum loss of seed occurs.

The mowing machine according to the invention comprises further improvements and refinements which appear from the following description in which some embodiments of the mowing machine are described in detail with reference to the accompanying drawings.

Figure 1:
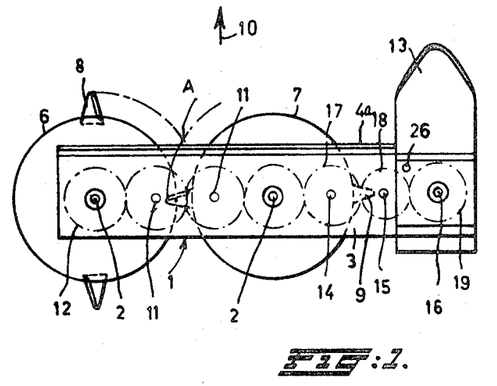
FIG. 1 is a view from below of a first embodiment of a mowing machine according to the invention.
Figure 2:
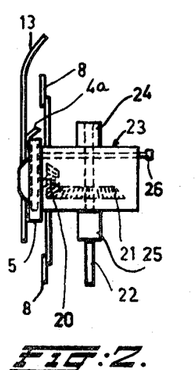
FIG. 2 is a side view of the machine of FIG. 1.
Figure 3:
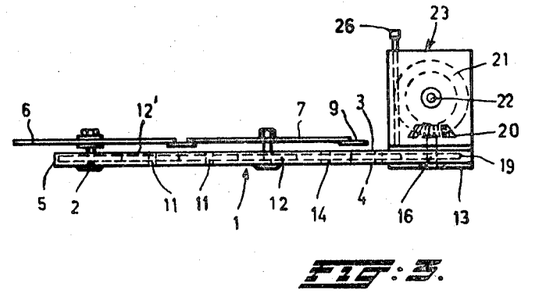
FIG. 3 is a rear view of the machine of FIG. 1.

The mowing machine according to FIGS. 1–3 has an oblong, flat, case-shaped support 1, from the upper wall of which protrude two upright shafts 2 which are arranged parallel to each other and spaced apart in the longitudinal direction of the support. The shafts pass through the upper wall 3 of the case, but the lower wall 4 of the case is fully closed. The upper and lower walls 3, 4 are rectangular and are held parallel to each other at a small spacing by a narrow upright wall which surrounds the edges of the upper and lower walls 3 and 4 and is connected therewith by welding or by other means, e.g. by screws.

The upper end of each shaft 2 carries a horizontal cutting disc 6 or 7, respectively, and each cutting disc carries cutters 8 or 9, respectively, at two diametrally opposite points of its periphery. The cutters 8 and 9 protrude substantially radially from the cutting discs 6 and 7 and preferably they are mounted in easily interchangeable manner against the lower surface of the discs. The spacing between the shafts 2 is such that the paths which are described by the cutting portions of the cutters 8, 9 during the rotation of the discs 6, 7 overlap over substantially the full radial size of said cutting portions. The width of the case 1 in the direction of motion of the mowing machine as a whole, which is indicated by an arrow 10, is such that the overlapping point A of the paths described by the ends of the cutters 8, 9 is before the front wall of the case and if a guardrail 4a is mounted in front of the case and parallel to the case, said overlapping point A is located even in front of said guard rail.

Between the upper wall 3 and the lower 4 of the case, each shaft carries a flat gear 12 and two intermediate shafts 11 carrying similar flat gears 12' are mounted parallel to and in line with shafts 2. To the right of the right hand gear 12 as seen in FIG. 1, there further intermediate shafts 14, 15, 16 carrying similar flat gears 17, 18, 19 are mounted in the case. The gear 19 is driven in a manner which will be described later and it drives the two shafts 2 with their discs 6, 7 via the intermediate gears 18 and 17, the first gear 12, the two intermediate gears 12' and the second gear 12, such that the two cutting discs 6, 7 rotate in mutually opposite directions and the portions thereof which move through their overlapping area have a rearward direction of motion with respect to the direction of motion of the whole machine as indicated by the arrow 10. There is no danger that the cutters 8 and 9 will contact each other during the rotation of the cutting discs since the cutters 8 are arranged on a diameter of the cutting disc 6 which is offset 90° with respect to the diameter of the cutting disc 7 on which the cutters 9 are arranged. In use, the crop is cut by the cutters 8 and 9 and the cut crop is moved to the rear by and over the upper surface of the cutting discs 6, 7. The crop may be loosely distributed over the full width of the field behind the machine or it may be laid in swaths behind the machine. By using special guide means, not shown, all discs may even discharge into a single swath. When harvesting cereals or grass seeds, the cut crop can be removed via a conveyor not shown, mounted immediately behind the case-shaped support.

A slide shoe 13 is mounted below the outer of the case 1. Said shoe is very flat and the case itself is also designed as flat as possible so that the cutting height of the cutters 8, 9 is less than two inches over the ground.

Usually, the mowing machine is mounted so as to protrude laterally from a tractor and it is driven from the power take-off of the tractor. The drive is transmitted to a casing 23 which is mounted on the upper wall of the near end of the case shaped support 1, over the protruding upper end of the intermediate shaft 16. In said casing, the upper end of the shaft 16 carries a bevel gear 20 which meshes with a bevel gear 21 on a horizontal shaft 22 which extends in the direction of motion of the mowing machine and which protrudes through the wall of the casing 23. The front and rear walls of the casing 23 carry two trunnions 24 and 25, respectively through which the shaft 22 protrudes, and the mowing machine is pivotally mounted via said trunnions 24, 25 to the support-structure not shown, carried by the tractor. A pipe 26 for filling oil into the case 1 passes through the casing 23.

The power take-off of the tractor is connected to the protruding end of the shaft 22, the drive ratio being so chosen that the cutting discs are driving at e.g. 3,000 revolution per minute. The support structure for the mowing machine can be so mounted to the three point linkage of the tractor that the mowing machine, in its usual operating position, slides over the ground while extending laterally from the tractor, whereas the machine can be pivoted about the trunnions 24, 25 to an upright transport position. By operation of the lifting device of the three point linkage of the tractor, the mowing machine can be adjusted to a higher operating position parallel to the ground, and by pivoting of the machine it can be adjusted to an inclined position, e.g. for mowing road shoulders or hedges.

Figures 13, 14:
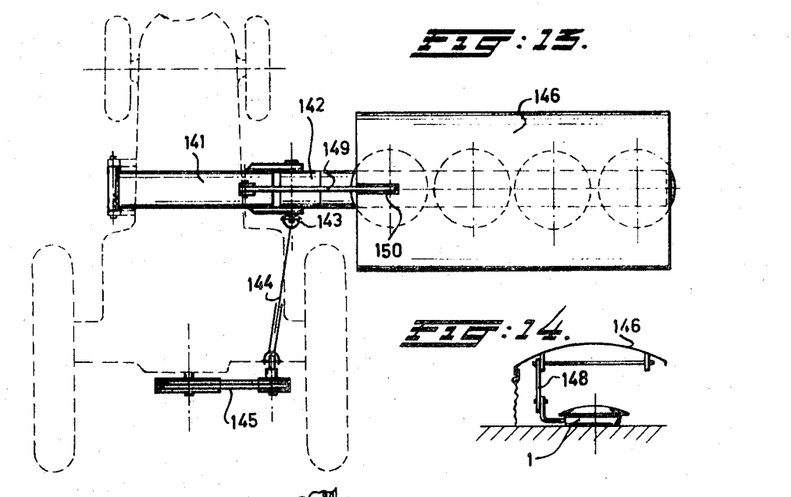
FIG. 13 is a view from above of the embodiment of FIG. 12.
FIG. 14 is a side view of the embodiment of FIG. 12.

The mowing machine may also be mounted between the front and rear wheels of the tractor, see FIG. 13.

Clogging of the mowing machine does not occur, not even when the crop is very stiff, and relatively small stones and the like do not impair the operation of the machine. To prevent damage by bigger obstacles as heavy stones and the like, the mowing machine may be mounted so as to pivot rearwardly, see FIGS. 8, 9. The cutters may be rotatably mounted on the discs such that they are held in their optimum cutting position by the centrifugal force and when the cutters hit a hard obstacle, they will swing away under the cutting discs and thereafter be returned to their operating position by the centrifugal force.

Figure 4:
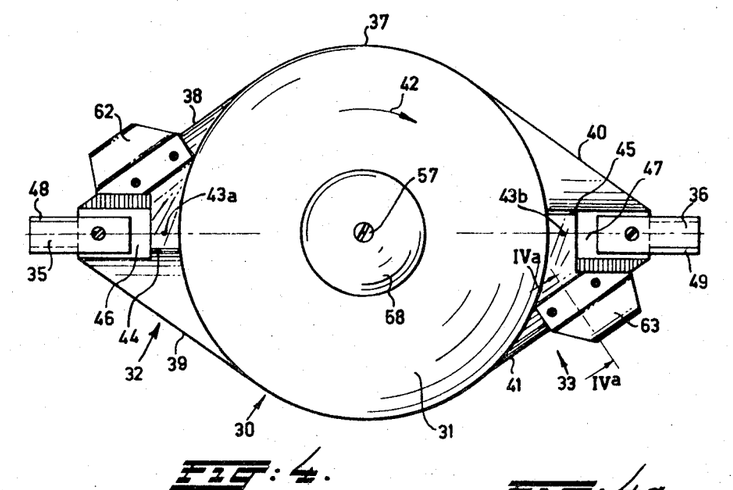
FIG. 4 is a view from above of a second embodiment of cutting disc.
Figures 4A, 5:
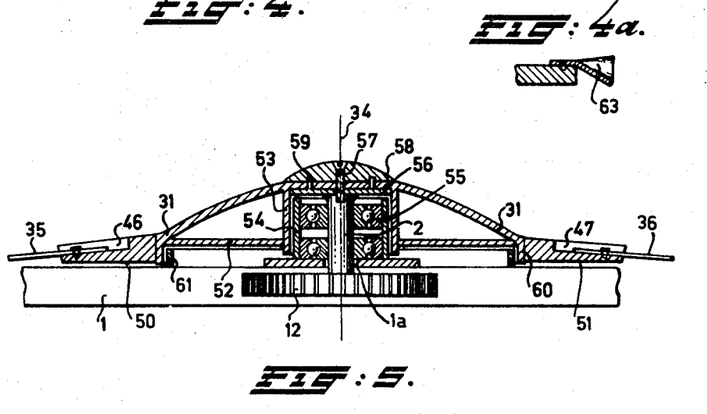
FIG. 4a is a cross section of part of FIG. 4, along the line IVa—IVa.
FIG. 5 is a medial cross section of the cutting disc of FIG. 4.

For preventing the mowed crop from being repeatedly cut when moved rearwardly by the cutting discs, said discs may be given a special shape, see FIGS. 4–7. The cutting disc 30 according to FIGS. 4 and 5 comprises a thin-walled dome shaped central portion 31 and two contiguous diametrally opposite side flanges 32, 33, which extend substantially radially from the perimeter of the central portion, in a plane normal to the axis 34 of the cutting discs. According to FIGS. 4 and 5, the shape of each flange 32, 33 as seen from above is substantially a triangle, a cutter 35 or 36, respectively comprising a steel strip being mounted in the apex of each triangle. The two sides 38, 39 or 40, 41 of the triangle which define the apex are tangential to the perimeter of the central portion 31 of the disc and merge with said perimeter 37. With respect to the direction of rotation of the cutting disc, which is indicated by an arrow 42, the sides 38 and 41 of the triangular flanges 32 and 33 can be termed the front edges. From said front edges 38 or 41, respectively, the upper surface of the flanges 32 or 33, respectively, is inclined upwardly in the direction of the diameter which connects both cutters 35 and 36 and said upper surface reaches, in the region of the cutters 35 or 36, respectively, a radial line which is upwardly inclined toward the axis 34 and merges smoothly with the dome shaped central portion 31. In the embodiment of FIGS. 4 and 5, the upwardly inclined upper surface of the flanges 32 and 33 is continued somewhat beyond the radial line 43a or 43b, respectively, and thereafter it is stepped downwardly to form an edge 44 or 45, respectively. From this edge 44 or 45, respectively to the rear edge 39 or 40, respectively of the flange, the upper surface of the flange 32 or 33, respectively, is flat.

Near the apex of the flange 32 or 33, respectively, there is a shallow recess 46 or 47, respectively, in which the inner portion of the cutter 35 or 36, respectively, is fixed so that the cutter does not protrude over the upper surface of the flange 32 or 33, respectively. The outer portion of the cutter 35 or 36, respectively, has a cutting edge 48 or 49, respectively, which protrudes radially beyond the cutting disc proper. The main plane of the cutters 35 and 36 is somewhat inclined with respect to the horizontal plane of rotation of the cutting disc.

In the embodiment according to FIGS. 4 and 5, the flanges 32 and 33 are solid and they have a flat lower surface 50 or 51, respectively, which is in a radial plane of the cutting disc. The central portion 31 of the cutting disc is hollow and it is defined by the dome shaped upper wall 31, a lower wall 52 which is in a radial plane, and a cylindrical inner wall 53 which defines a central space open to the bottom but closes the hollow space between the mentioned upper and lower walls. Within the cylindrical wall 53 and spaced therefrom, there is a stationary sleeve 54, which is fixed to the upper wall of the case shaped support 1 of the machine and which comprises ball bearings 55 in which the shaft 2 is journalled. The lower end of the shaft 2 passes through the upper wall of the case 1 and within the case 1 it carries the gear 12, and the upper end of the shaft 2 carries a disc 56 which supports the cutting disc. A screw 57 is passed through an upper dome shaped disc 58, the flat area of the dome shaped portion 31 of the cutting disc and through the disc 56 which is welded to the shaft 2, and is screwed into a screw threaded bore in the shaft 2. Pins 59 are mounted on the upper surface of the disc 56, and they pass through holes in the disc portion 31 and into blind holes in the upper disc 58 so as to ensure that the several components will rotate in unison.

The lower wall 52 of the central portion of the cutting disc is somewhat higher than the lower wall 50 to 51, respectively, of the flanges 32 or 33, respectively, and in between there is a cylindrical wall 60 which surrounds with some spacing an upright collar 61 welded to the upper wall of the case 1 of the mowing machine, concentrically with the shaft 7. The collar 61 and the stepped wall 60 prevent penetration of small pieces of the cut crop, dirt and the like into the area of the drive shaft 2.

If desired, a blade 62 or 63, respectively, can be fixed to the front edge 38 or 41, respectively, of the flanges 32, 33, respectively, said blade projecting from the front edge in forward direction with respect to the direction of rotation of the disc and having an inclined configuration when viewed from the side (see FIG. 4a). The blades 62, 63 act as a fan which causes an air flow to lift the stalks before they are cut.

When the cutting discs according to FIGS. 4 and 5 are used in a mowing machine e.g. according to FIGS. 1–3, the crop cut by the cutters of a cutting disc is conveyed by the rotating movement of the cutting disc towards the overlapping area of the two cooperating discs and there the crop will meet the upwardly inclined surface at the front edge of the next arriving flange of the two cooperating cutting discs, which gives an upward component of motion to the cut crop so that it will not again contact the cutters of the cutting discs during its rearward movement through the overlapping area.

An additional advantage of the flanged cutting disc is that two cooperating discs can be positioned closer together than it would be possible with circular discs without contact of the cutters of the adjacent discs.

Figure 6:
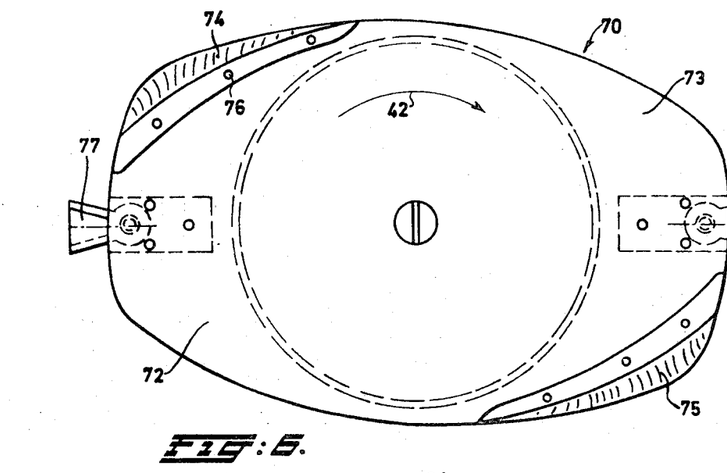
FIG. 6 is a view from above of a third embodiment of a cutting disc.
Figure 7:
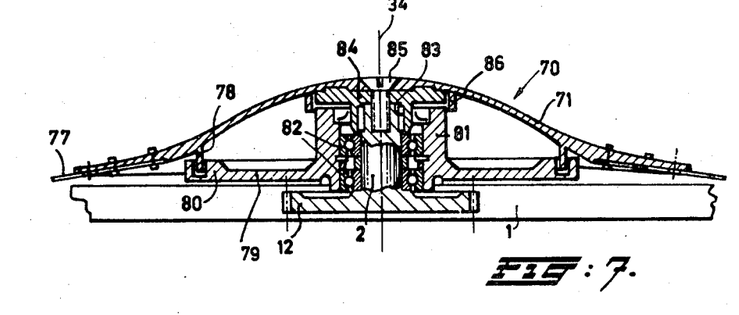
FIG. 7 is a medial cross section of the cutting disc of FIG. 6.

The same advantages can be obtained with the embodiment according to FIGS. 6 and 7 in which the central dome shaped portion 71 of the cutting disc 70 and the two flanges 72, 73 are a unitary structure which is e.g. pressed from sheet steel or formed from synthetic resin. Essentially, the cutting disc 70 of FIGS. 6 and 7 has a shape similar to the cutting disc 30 of FIGS. 4 and 5, but the flanges are broader and their outer edge is defined by a part of a circle which is concentric with the axis 34. Moreover, there is no step between the front and rear portions of the flange, but the continuous upper surface of the flange is preferably somewhat convex to cause the upward component of motion of the cut crop. This motion can also be obtained by means of strips 74, 75 which are mounted, e.g. by means of screws 76, along the front edge of the flanges 72 and 73 as seen in the direction of rotation 42. The strips 74, 75 may be made of wear resistant material and may be mounted so as to be easily replaceable when worn. In addition to causing the upward component of motion of the cut crop, the strips also clean the upper surface of the case-shaped support 1 when they pass over it during their rotation.

In this embodiment, the cutters 77 are mounted rotatably under the flanges 72, 73 such that they are held in their projecting position by the centrifugal force and upon hitting a stone or another obstacle they may swing away so as to be covered by the flange, after which they reach their operating position again under the action of the centrifugal force.

In this embodiment, the lower surface of the thin walled cutting disc 70 carries a downwardly directed collar 78 in the area where the dome shaped portion 71 merges with flanges 72 and 73, said collar rotating without contact in a circular groove 80 of a plate 79 attached to the upper wall of the case shaped support 1. The collar and the groove provide a seal against penetration of dirt to the drive mechanism of the cutting disc. A sleeve 81 which contains two ball bearings 82 is unitary with the plate 79. Via the ball bearings 82, the drive shaft 2 of the cutting disc is mounted in the sleeve 81. The lower end of the shaft 2 is situated within the case 1 and carries the driving gear 12, whereas the upper end of the shaft 2 which projects above the sleeve 81 is provided with splines 83, engaging with similar interior splines of a downwardly projecting portion of a reinforcement member 84 which is centrally fixed to the lower surface of the cutting disc 70.

The cutting disc 70 and the shaft 2 are connected by a screw 85. The reinforcement member 84 is surrounded by a downwardly directed collar 86 which forms an additional seal against penetration of dirt.

Figure 8:
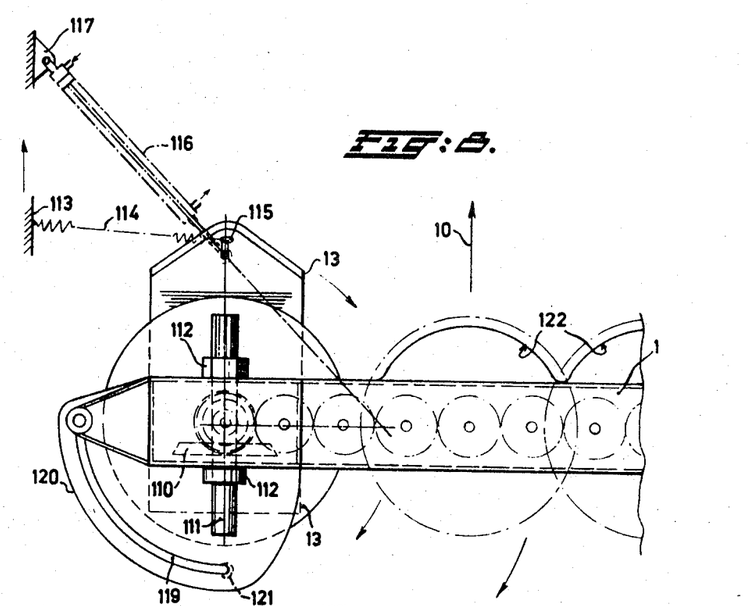
FIG. 8 is a view from above of another embodiment of the mounting end of the mowing machine.
Figure 9:
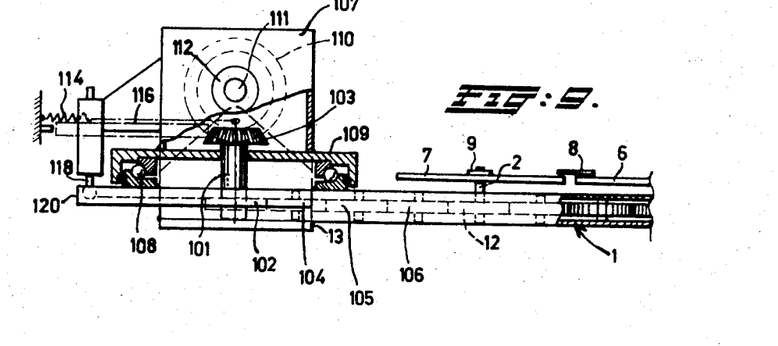
FIG. 9 is a rear view, partly in cross section, of the device of FIG. 8.

FIGS. 8 and 9 show an embodiment of the inner end of the case shaped support which is to be connected with the support structure carried by the three point linkage of the tractor. The case shaped support 1 carries as previously described, an upwardly projecting shaft 2 on which are mounted a gear 12 within the case 1 and a cutting disc 6 or 7, respectively above the upper wall of the case 1, the cutting discs 6 or 7 respectively carrying cutters 8 or 9, respectively. In use, the mowing machine as a whole moves in the direction of the arrow 10. The cutting discs may have the configuration as shown in FIGS. 4 and 5 or in FIGS. 6 and 7, or any other suitable configuration.

From the upper wall of the case 1, at the left end thereof as seen in FIGS. 8 and 9, projects a shaft 101 the lower end of which carries within the case a flat gear 102, and the projecting upper end of the shaft 101 carries a bevel gear 103. Between the gear 102 and the gear 12 under the first cutting disc 7, there are several intermediate gears 104, 105 and 106 which are journalled on intermediate shafts in the case 1 and which transmit the drive of the shaft 101 to the gear 12.

A slide shoe 13 is mounted under the left end of the case 1, and the upper wall of the case 1 is enlarged concentrically with the shaft 101. A casing 107 is rotatably carried on the enlarged part of the case 1 via a ball bearing 108. The ball bearing 108 is located in a widened lower compartment 109 of the casing 107, and the shaft 101 projects through an opening in the upper wall of the casing compartment 109 into the upper compartment of the casing 107, where it carries the bevel gear 103. The bevel gear 103 cooperates with a bevel gear 110 mounted on a shaft 111 which extends in the direction of motion of the mowing machine and projects from the casing 107 both at the front end and at the rear sides. One of the projecting ends of the shaft 111 will be connected with the power take-off shaft of the tractor for driving the mowing machine. Both projecting ends of the shaft 111 are surrounded by hallow trunnions 112 with which the mowing machine is rotatably suspended from the support structure which is carried by the three point linkage of the tractor. By operating the lifting mechanism of the three point linkage of the tractor, the operating height of the mowing machine can be adjusted if it is not desired that it rests on the shoe 13. The support structure may also comprise means for pivoting the case 1 about the trunnions 112 toward an upright position.

Via the ball bearing 108 located between the casing 107 and the case shaped support 1, the case 1 is rotatable bout the shaft 101 in a horizontal plane. A sealing means is arranged between the lower compartment 109 of the casing and the outer race of the ball bearing 108 so as to prevent penetration of dirt and leakage of lubricant. By providing the possibility of rotation of the case 1 in the horizontal plane, one obtains a protection of the cutting discs and other parts of the machine against damage by hitting hard obstacles such as stones.

A tension spring 114 is arranged between a hole 115 in the front portion of the shoe 13 and a fixed point 113 e.g. a part of the tractor, said spring tending to hold the case 1 in the operating position shown in FIG. 8 in which the case 1 projects laterally from the tractor. Instead of or in addition to the spring 114, a hydraulic or pneumatic cylinder 116 may be mounted between the front portion of the shoe 13 and a fixed point 117 of the tractor. The mowing machine may be adjusted to any desired angle with respect to the tractor by means of the pneumatic or hydraulic cylinder 116.

A pin 118 is mounted laterally of the casing 107 so as to be vertically slidable and said pin cooperates with a groove 119 in the upper face of a lateral flange 120 of the case 1, said groove having the shape of a quarter circle and the end thereof being spherically enlarged so as to cooperate with the spherical lower head of the pin 118. The pin 118 is spring loaded and may also be manually or mechanically movable. The groove 119 is concentrically connected with the shaft 101 so that the pin 118 slides along the groove 119 when the case 1 pivots in the horizontal plane. The spherical ends 121 of the groove 119 fix the extreme positions of the case 1 in that the spherical head of the pin 118 is held in the end of the groove by spring force and only after overcoming said spring force, the case will move from its extreme position.

The cutting discs are further protected in that plate segments 122 are mounted concentric with the shafts 2 on the front wall of the case 1 as seen in the direction of motion of the machine. Said segments 122 are thus located under the front portion of the cutting discs and serve as protecting means. The radius of the segments 122 is chosen so that only the cutting portion of the cutters projects beyond the segments 122.

In use, the case 1 with the shoe 13 may pivot about the shaft 101 against the action of the spring 114 when the case or a segment 122 hits an obstacle, such as a heavy stone, during the movement of the machine. After the obstacle has been passed, the spring 114 automatically pulls the case back into its operating position. This prevents damage to the case 1 and to the cutting discs. There is small risk that the cutters will be damaged by stones or the like, but the cutters are easily replaceable and if the cylinder 116 is provided, the tractor driver may pivot the case backwardly about the shaft 101 before the obstacle has been reached, so that the cutters are not damaged.

Figure 10:
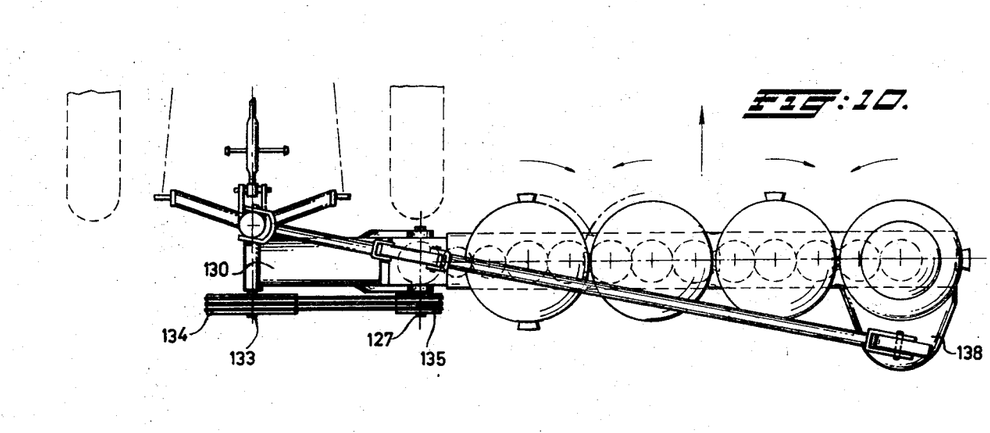
FIG. 10 is a view from above of a further embodiment of a mowing machine according to the invention.
Figure 11:
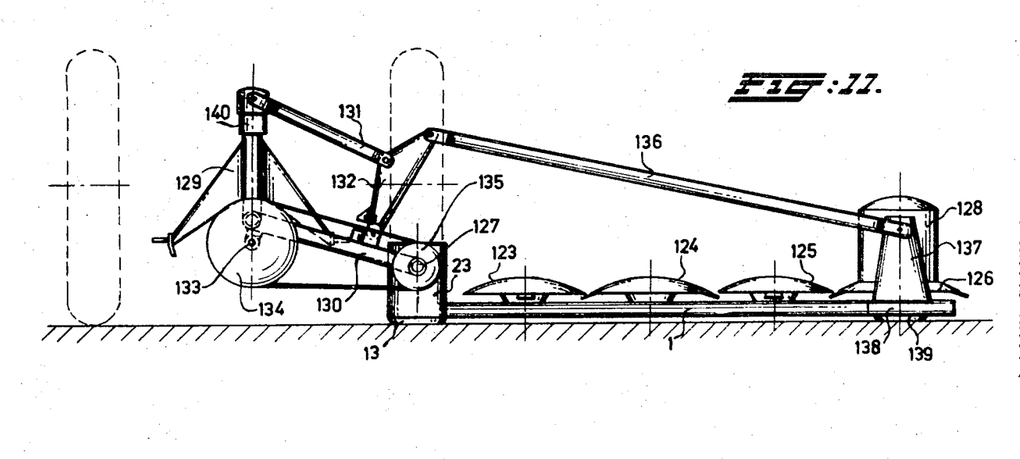
FIG. 11 is a rear view of the embodiment according to FIG. 10.

In the embodiment according to FIGS. 10 and 11, the case 1 carries four cutting discs 123, 124, 125 and 126. As described with reference to the embodiment of FIG. 1, a slide shoe 13 and a gear casing 23 are provided at the left end of the case 1. From the rear wall of the casing 23 projects a shaft 127 which extends in the direction of motion of the mowing machine and which receives its drive from the tractor. The casing 23 comprises a gear train which transmits the drive to a gear train within the case 1 so as to drive the several cutting discs 123 to 126. The directions of rotation of the several cutting discs are shown by arrows in FIG. 10. As shown by the arrows, the cutting discs 123 and 124 are a cooperating pair which discharge the cut crop in their overlapping area and over the adjacent parts of the upper surface of the discs. The discs 125 and 126 form a second similarly cooperating pair. The upper surface of the disc 126 carries a drum 128 which rotates together with the disc 126 and which keeps the strip of ground over which the disc 126 is moved, free from cut crop, so that at the next pass of the tractor, there is a free strip of ground over which the wheels of the tractor may roll. The drum 128 also cooperates with the disc 125 to discharge the cut crop to the rear of the machine.

FIGS. 10 and 11 also show an embodiment of the support structure which connects the mowing machine with the tractor. This support structure comprises a three-armed frame 129, which is removably connected with the three point linkage of the tractor and which comprises pivots for a lower support arm 130 and an upper support arm 131. The end of the lower support arm 130 which is remote from the frame 129 carries the casing 23 of the mowing machine and an upwardly directed intermediate arm 132 is pivoted to an intermediate point of the arm 130. The end of the upper arm 131 remote from the frame 129 is pivotally connected to an intermediate point of the intermediate arm 132. The frame 129 further carries an intermediate shaft 133, the front end of which can be coupled to the power take-off shaft of the tractor and the lower end of which carries a pulley 134. The shaft 127 which projects from the casing 23 also carries a pulley 135 and a number of V-belts is entrained over the pulleys 134 and 135.

One end of a rod 136 is pivotally connected to the upper end of the intermediate arm 132 and the other end of the rod 136 is pivotally connected to the upper end of a substantially vertical member 137 which is unitary with a substantially horizontal member 138 which is unitary with and projects rearwardly from the outer part of the case 1.

The weight of the outer end of the case 1 is transmitted to the support structure 129 via the rod 136, so that the case 1 may be designed lighter than if it would be self-supporting. Thus, the total height of the case 1 may be reduced and the cutting plane of the cutters can be closer to the ground. In addition to the shoe 13 at the left end of the case 1, there is a second shoe 139 under the horizontal member 138 at the right end of the case-like support beam 1, so that when mowing on level field, the case may be supported on the ground at both ends.

In this embodiment, the case-like support beam 1 is rotatable in a limited amount about the axis of the shaft 127 of the casing 23, but this movement only provides a certain possibility of adjustment of the operating position of the beam 1. The road transport position of this embodiment is obtained by pivoting the whole structure rearwardly about the vertical axis 140 of the frame 129 so that the machine extends behind the tractor in rearward direction.

Figure 12:
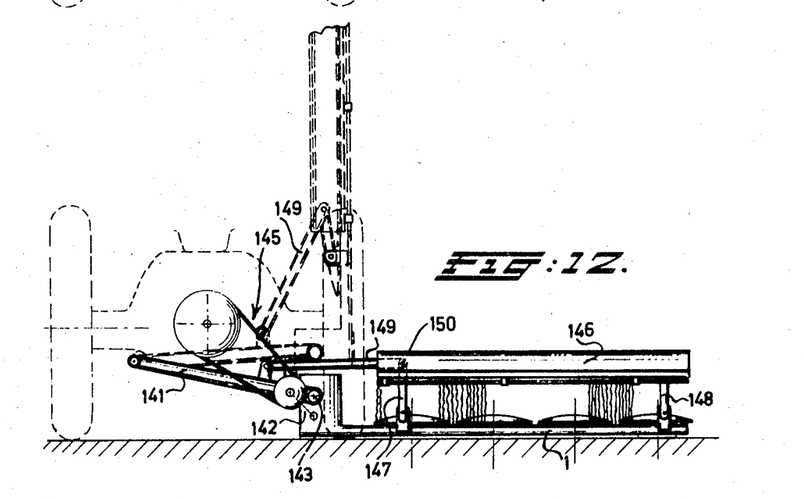
FIG. 12 is a rear view of a further embodiment of the mowing machine, in which the operating position is indicated in full lines and the upright transport position is indicated in broken lines.

In the embodiment according to FIGS. 12, 13 and 14, the support structure of the mowing beam is not mounted behind a tractor, but between the front wheels and the rear wheels of a tractor, which provides a better view for the driver of his work. The support structure comprises a support arm 141 which extends from the gear casing 142 of the mowing machine towards the remote side of the tractor, the remote end of the arm 141 being pivoted to the remote side of the tractor. The shaft 143 of the gear casing 142 is driven via an intermediate shaft 144 which is adjustable in longitudinal and in angular directions and which is connected to the power take-off shaft of the tractor via a V-belt arrangement.

Since the cutting discs lie fully exposed above the upper wall of the case 1, they cause danger and thus, they are covered in this embodiment by a steel cap 146, which is connected in parallelogram fashion to the case 1 by pivoting rods 147 and 148. The cap 146 is further connected by a pivoting arm 149 to the support arm 141 so that the arm 149 causes flattening of the parallelogram and thus decreases the distance between the cap 146 and the beam 1 when the beam 1 pivots upwardly about the shaft 143 to the upright road transport position. Thus upon upward pivoting of the beam 1, the steel cap 146 is prevented from abutting against the tractor and stopping the beam in an inclined position. In FIG. 12, the vertical position of the beam 1 is indicated in broken lines, from which it appears that the cap almost abuts against the cutting discs. In the side edge of the cap 146 which is adjacent to the tractor, there is a slot 150 which receives the arm 149 upon the upward pivoting of the device.

Figures 15, 16:
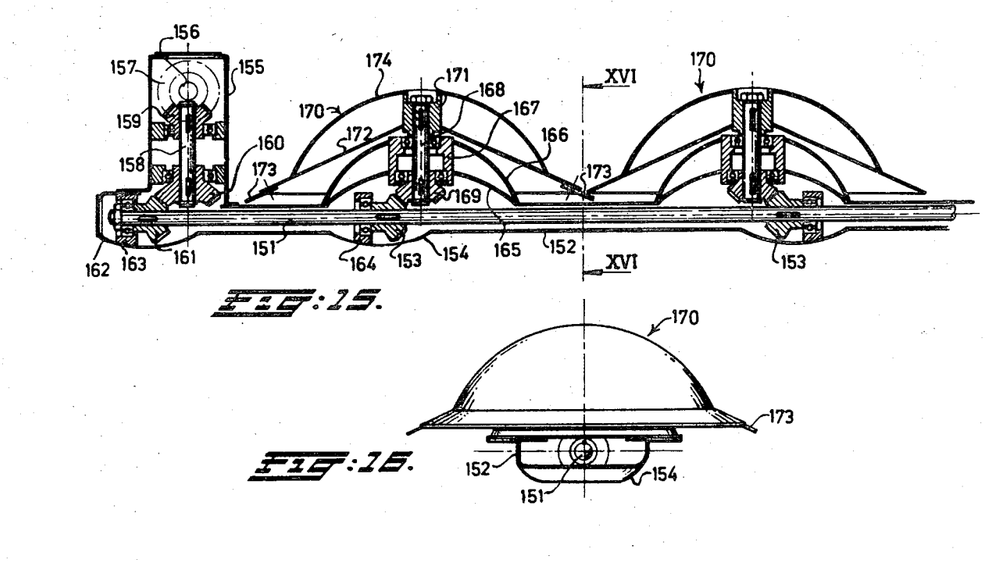
FIG. 15 is a longitudinal section of a part of a further embodiment of the mowing machine.
FIG. 16 is a cross scetion along the line XVI—XVI in FIG. 15.

FIGURES 15 and 16 show an embodiment in which a through shaft 151 for driving all cutting discs is arranged longitudinally in the case-shaped support 152 and a bevel gear 153 is fixed on said shaft near each cutting disc. So as to obtain sufficient space for the bevel gears 153 on the through shaft 151 and yet to maintain a small vertical size of the case-shaped support 152, the lower wall of said case has a downwardly curved portion near each bevel gear and each said downwardly curved portion is so shaped that it may act as a slide shoe. On the upper wall of the end of the case 152 which is near the tractor, there is a gear casing 155 from which protrudes a drive shaft 156 which extends in the direction of motion of the machine and a bevel gear 157 is fixed on the part of said shaft 156 which extends into the gear casing. In the gear casing 154, there is also arranged a vertical shaft 158 the upper end of which carries a bevel gear 159 meshing with the bevel gear 157 on the drive shaft 156. The lower end of the vertical shaft 158 carries a bevel gear 160 meshing with a bevel gear 161 on the end of the through shaft 151. Below the gear 161, the case 152 is also provided with a downwardly curved portion 162 of its lower wall so as to obtain the necessary space for the bevel gear 161 and for a bearing 163 of the shaft 151. The downwardly curved portion 162 is also shaped as a slide shoe.

A bearing 164 for the through shaft 151 is provided near each bevel gear 153, in the space defined by the downwardly curved portion 154 of the lower wall and an upwardly curved portion 165 of the upper wall of the case beam 152. Said area of the case beam is reinforced by a dome shaped member 166 welded over the upwardly curved portion 165. A sleeve 167 is centrally welded into the parts 165 and 166 and a vertical shaft 168 is journalled in said sleeve. The lower end of the shaft 168 carries a gear 169 meshing with gear 153. The successive gears 153 which drive the successive cutting discs 170 are arranged alternately to the right and to the left of the cooperating gear 169 so that the successive cutting discs 170 are alternately driven in opposite directions.

Each cutting disc 170 carries a centrally mounted hub 171 which is fixed to the upper end of the relative vertical shaft 168 protruding above the case 152. The cutting disc 170 is composed of a conical disc 172 which carries a cutter 173 at two diametrally opposite positions of its lower edge, and a dome shaped second disc 174. The hub 171 is welded to both discs 172 and 174 and the outer edge of the disc 174 is welded to the conical disc 172.

FIGURES 17 to 20 show an embodiment in which the cutting discs 175 are driven by flat spur gears 177 located in protrusions 178 of the front wall of the case shaped support 176 as seen in the direction of motion of the machine. The intermediate gears 179 are located in the main part of the case beam 176. Seen from above, the protrusions 178 are triangular with rounded edges. Thus, the cutting discs 175 are mounted in a forward position with respect to the main part of the case beam 176, which produces on the one hand protection of the greater portion of the lower face of the cutting discs 175 by the case beam 176 itself and its forward protrusions 178, and on the other hand it improves the cutting action. For the overlapping point of the cutting portions of the cutting discs 175 should be located in front of the front wall of the case beam 176 so as to obtain good cutting action, and if the front wall of the case beam is straight it may easily be thickened by dirt which sticks to it and which causes the overlapping point to be above the crust of dirt so that the cutting and/or conveying action of the cutting discs is impaired.

Figure 18:
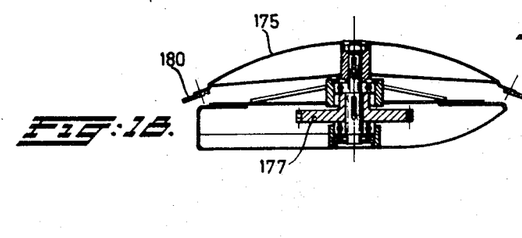
FIG. 18 is a cross section along the line XVIII—XVIII in FIG. 17.
Figure 19:
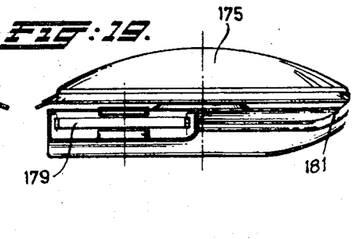
FIG. 19 is a cross section along the line XIX—XIX in FIG. 17.

According to FIGS. 18 and 19, the protrusions 178 are extended in forward direction until a point just within the cutting cycle of the cutters 180 and moreover its lower face is upwardly curved in forward direction so that these protrusions, which are normally clear from the ground, readily follow the ground when it is not level.

Figure 17:
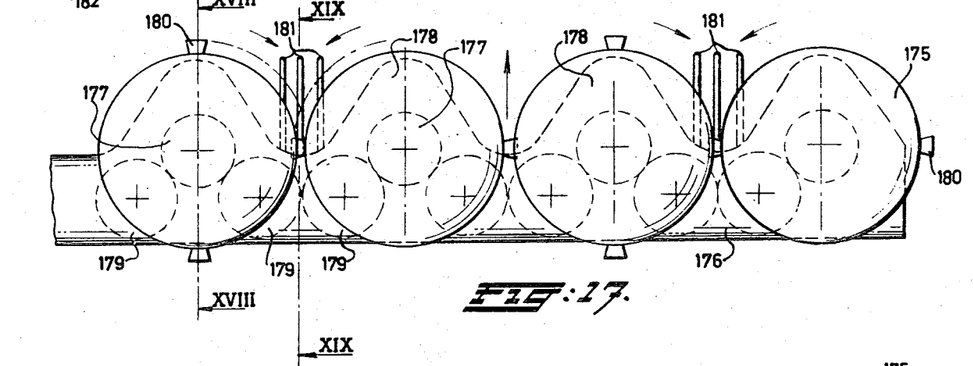
FIG. 17 is a view from above of a further embodiment of the mowing machine.

Forwardly directed pins 181 may be arranged in the overlapping area between each pair of cooperating cutting discs 175, said pins preventing stones from getting caught between the discs. The pins 181 may also be upwardly curved as slide shoes.

Figure 20:
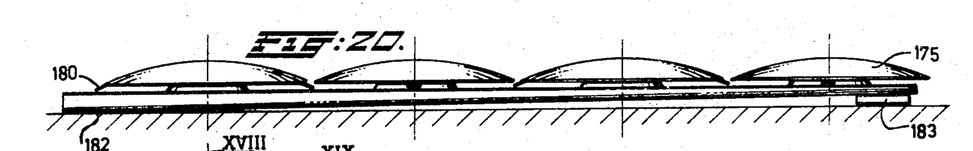
FIG. 20 is a rear view of the mowing machine of FIG. 17.

As shown in FIG. 20, the cross section of the case beam 176 may decrease toward its outer end so as to obtain an equal strength over the length of the case beam and to save weight. In this event, the slide shoes 182 at the inner end and 183 at the outer end have a mutually different height so as to keep all cutting discs 175 at equal height above the ground.

Several variants are possible within the scope of the invention. A vertical guide sheet or swath plate for guiding the cut crop may be provided at the outer end of the case beam and outward and rearward with respect to the outer cutting discs. Said swath plate may be connected to the end of the case so as to pivot against spring action and it may cooperate e.g. with the drum shown in FIG. 11. Instead, a separated drum may be mounted to the rear of the outer end of the case beam, said drum being e.g. slowly rotated by a ground wheel provided under the drum.

In this embodiment, no swath plate is necessary and the separate drum may partly overlap the path of the outer cutting disc.

What we claim is:

1. A mowing machine comprising an oblong, flat, case-like support adapted to be held parallel and close to the ground while the machine is in operation, a plurality of upright shafts rotatably mounted on said support in spaced apart relation along its length, drive means within said support for rotating said shafts simultaneously, said shafts extending through the upper wall of said support, a "disk" fixed to each shaft at a point immediately above said support, the upper surfaces of said disks being completely exposed and said disks being spaced apart in a direction along the length of said support so that they do not overlap, cutters carried by each of said disks projecting radially beyond the peripheral edge thereof, said cutters moving through a circular path which extends forward of said support the circular paths followed by the cutters of an adjacent pair of disks being substantially parallel to the ground and overlapping each other at a point in front of said support, said disks all being arranged in substantially the same plane and the upper surfaces of said disks cooperating to support the cut crop and move it rearwardly, said machine being devoid of stationary shear means for cooperating with said cutters to cut grass, said cutters performing their grass cutting function solely by a scythe action.

2. A mowing machine as defined in claim 1 wherein the peripheral edges of a pair of adjacent disks are spaced from each other a distance less than the radial length of one of said cutters so that the path followed by a "cutter extends beneath the disk adjacent to it."

3. A mowing machine as claimed in claim 1, in which each cutting disc is provided with two diametrically opposite cutters which protrude substantially radially from the periphery of the cutting disc, the cutters of two adjacent cutting discs being mutually off-set by 90°.

4. A mowing machine according to claim 1 characterized in that the mowing discs are arranged in pairs which rotate in mutually opposite directions.

5. Mowing machine as claimed in claim 1, in which lower wall of the case-like support carriers at least one slide shoe.

6. A mowing machine as defined in claim 1, wherein there are at least three of said disk-carrying shafts mounted on said support, one end of said support is adapted to be attached to a tractor so that it extends laterally of the tractor, at least one crop guiding means at the other end of said support positioned above the outermost disk, crop guiding means being absent from above the center disk, said outermost disk rotating in a direction for converging the crop laterally toward the tractor and to the rear of the mowing machine, said crop guiding means assisting in this conveying process.

7. A mowing machine as defined in claim 6 wherein said crop-guiding means is a drum coaxial and rotatable with said outermost disk.

8. A mowing machine as defined in claim 1 wherein the margin of each of said disk is inclined downwardly and outwardly, and said cutters are mounted on said inclined margins so that they are inclined.

9. A mowing machine according to claim 1 characterized in that each mowing disc has an oblong shape.

10. A mowing machine as claimed in claim 3, in which each cutting disc has a central portion with a dome shaped upper face and two diametrically opposite side flanges which merge into the central portion and which are substantially radially directed, in a plane transverse to the axis of the cutting disc, the outer end of each flange carrying at least one cutter, and the side edges of each flange tapering from the central dome shaped portion towards the cutter.

11. A mowing machine as claimed in claim 10, in which the upper surface of each flange is upwardly inclined from the front side edge, as seen in the direction of rotation, toward a radial line in the area of the cutter, which radial line is upwardly inclined towards the cutting disc axis and merges with the central dome shaped portion, the upper face of the flange being lowered between said radial line and the rear side edge as seen in the direction of rotation.

12. A mowing machine as claimed in claim 11, in which the lowering of the upper face of each flange is in the shape of a step configuration behind said radial line.

13. A mowing machine as claimed in claim 10, in which the upper surface of each flange is slightly convex from its front side edge towards its rear side edge, and a strip of wear resistant material is removably fixed near the front side edge.

14. A mowing machine as claimed in claim 10, in which the lower face of each cutting disc has a downwardly directed circular wall section which surrounds with some clearance an upwardly directed collar which is provided concentrically with the cutting disc shaft on the upper wall of the case shaped support.

15. A mowing machine according to claim 1 characterized in that a protecting means is mounted under the front portion of each mowing disc.

16. A mowing machine according to claim 15 characterized in that the protecting means comprise forwardly directed protrusions of the front wall of the case-like support, said protrusions extending to a point close to the circumference of the mowing discs.

17. A mowing machine according to claim 16, characterized in that each forwardly directed protrusion of the front wall of the case-like support carries a mowing disc shaft, the lower end of each shaft carrying a drive gear located in the space of the support defined by said protrusion.

18. A mowing machine according to claim 16, characterized in that said protrusions also extend along the bottom wall of the support so as to provide slide shoes.

19. A mowing machine as claimed in claim 15, in which the protecting means comprises a forwardly directed plate shaped segment mounted concentrically with each cutting disc at the front of the case-like support.

20. A mowing machine as claimed in claim 15, in which the protecting means comprises a bar mounted parallel to and spaced in front of the case-like support.

21. A mowing machine as claimed in claim 1, in which a cap is mounted over the cutting discs, one end of said cap being connected to an upwardly extending member at the outer end of the case-like support and the other end of which being connected with an upwardly extending member at the inner end of the case-like support.

22. A mowing machine as claimed in claim 21, in which the connection of the cap and the case shaped support is such as to form a pivoting parallelogram, and the inner end of the cap is connected by a pivoting arm to the frame which carries the machine, such that when the machine is swung to the upright road transport position, the cap is moved closer to the cutting discs by flattening of the parallelogram.

23. A mowing machine as claimed in claim 1, in which one end of the case-like support carries a casing, drive transmission means within said casing, comprising an upright shaft which projects into the interior space of the case-like support and is connected with the drive transmission means located in said interior space, said casing being pivotable with respect to the case shaped support about the axis of said upright shaft.

24. A mowing machine as claimed in claim 23 including stops for limiting the pivoting movement of the case-like support with respect to said casing between an operating position transverse to the direction of motion and a yielded position in which the case-like support extends rearwardly from the casing, and means are provided to maintain the case-like support normally in its operating position.

25. A mowing machine as claimed in claim 24, in which the means which maintain the case shaped support normally in its operating position comprise springs mounted between a part of the case shaped support and a relatively fixed part.

26. A mowing machine as claimed in claim 24, in which the means which maintain the case shaped support normally in its operating position comprise a pneumatic or hydraulic cylinder operating between a part of the case shaped support and a relatively fixed part such that the case shaped support can be swung to any desired angular position.

27. A mowing machine as claimed in claim 23, in which the case shaped support is provided with an enlargement around the casing, a groove being provided in this enlargement concentrically to the pivot axis of the case-like support, both ends of said groove serving as stops for the pivoting movement of the case shaped support, and a pin which slides in the groove and is connected to the casing and cooperates with said stops.

28. A mowing machine as claimed in claim 1, in which pins, which extend substantially horizontally in the direction of movement of the machine, are mounted at the front end of the case-like support, in the overlapping area of the paths of movement of each pair of cooperating cutting discs.

29. A mowing machine as claimed in claim 1 in which each cutting disc is provided with at least one extension acting as a fan blade.

30. A mowing machine as claimed in claim 1, in which the end of the case-like support remote from the tractor carries one or more "guide plates," which are preferably mounted so as to swing against spring action.

31. A mowing machine as claimed in claim 1, in which a separate drum is mounted behind the outer end of the case shape support remote from the tractor, said drum being slowly rotatable and partly overlapping the outer cutting disc.

References Cited

UNITED STATES PATENTS

| | | | |
|---|---|---|---|
| 2,746,227 | 5/1956 | Tower | 56—25.4 |
| 2,991,612 | 7/1961 | Holmes | 56—25.4 |
| 3,070,938 | 1/1963 | Winget | 56—6 |
| 3,138,911 | 6/1964 | Pounds | 56—235 |
| 2,625,784 | 1/1953 | Kelsey | 56—192 |
| 2,690,040 | 9/1954 | Miller et al. | 56—6 |
| 3,040,502 | 6/1962 | Smith et al. | 56—6 |
| 3,234,719 | 2/1966 | Rank | 56—25.4 |
| 3,395,522 | 8/1968 | Zweegers | 56—295 |

ALDRICH F. MEDBERY, Primary Examiner

U.S. Cl. X.R.

56—6, 295